United States Patent
Braun et al.

(10) Patent No.: US 7,290,933 B2
(45) Date of Patent: Nov. 6, 2007

(54) HYDRODYNAMIC BEARING, SPINDLE MOTOR AND HARD DISK DRIVE

(75) Inventors: Dieter Braun, Spaichingen (DE); Joerg Hoffmann, Mettlach (DE); Andreas Kull, Donaueschingen (DE)

(73) Assignee: Minebea Co., Ltd., Nagano-ken (JP)

( * ) Notice: Subject to any disclaimer, the term of this patent is extended or adjusted under 35 U.S.C. 154(b) by 51 days.

(21) Appl. No.: 10/951,984

(22) Filed: Sep. 28, 2004

(65) Prior Publication Data
US 2005/0074191 A1 Apr. 7, 2005

(30) Foreign Application Priority Data
Oct. 2, 2003 (DE) ................. 103 45 907

(51) Int. Cl.
*F16C 17/10* (2006.01)
(52) U.S. Cl. ..................................... 384/107
(58) Field of Classification Search ............... 384/110, 384/107, 118, 112, 113
See application file for complete search history.

(56) References Cited

U.S. PATENT DOCUMENTS

| | | | |
|---|---|---|---|
| 4,877,381 A * | 10/1989 | Johnson et al. | 384/118 |
| 6,828,709 B2 * | 12/2004 | Grantz et al. | 384/110 |
| 2004/0264819 A1 * | 12/2004 | Weingord et al. | 384/107 |

* cited by examiner

*Primary Examiner*—Lenard A. Footland
(74) *Attorney, Agent, or Firm*—Cooper & Dunham LLP

(57) ABSTRACT

The invention relates to a hydrodynamic bearing, particularly for a spindle motor, comprising a shaft, a thrust plate connected to the shaft and a bearing sleeve closed at one end by a cover plate, the bearing sleeve enclosing the shaft and the thrust plate with a slight radial spacing forming a concentric bearing gap filled with a lubricant. As is already known, the surfaces of the bearing sleeve and the shaft facing each other form at least one radial bearing region and the surfaces of the bearing sleeve, the cover plate and the thrust plate facing each other form at least one axial bearing region. In the hydrodynamic bearing according to the invention, at least one connecting channel is provided which connects a section between the bearing sleeve and the shaft abutting the radial bearing region and a section of the bearing gap abutting the axial bearing region to each other.

18 Claims, 7 Drawing Sheets

HYDRODYNAMIC BEARING, SPINDLE MOTOR AND HARD DISK DRIVE

BACKGROUND OF THE INVENTION

The invention relates to a hydrodynamic bearing, a spindle motor and a hard disk drive.

OUTLINE OF THE PRIOR ART

A spindle motor for a hard disk drive usually comprises a rotating component, the rotor, with which an annular permanent magnet is associated, and a stationary component, the stator, with which a lamination stack wound with coils is associated, the rotor being rotatably supported with respect to the stator by means of an appropriate bearing system.

Hydrodynamic bearings are being increasingly used alongside roller bearings which have been used for this purpose for a long time. A hydrodynamic bearing is a further development of a sliding bearing formed from a bearing sleeve having a cylindrical inner bearing surface and a shaft having a cylindrical outer bearing surface set into the sleeve. The diameter of the shaft is slightly smaller than the inside diameter of the sleeve as a result of which a concentric bearing gap is formed between the two bearing surfaces, the bearing gap being filled with a lubricant, preferably an oil, forming a continuous capillary film.

The bearing sleeve and shaft together form the radial bearing region. A groove pattern is formed on at least one of the two bearing surfaces, the groove pattern exerting local accelerating forces on the lubricant located in the bearing gap due to the relative rotary movement. A kind of pumping action is created in this way which presses the lubricant through the bearing gap under pressure and results in the formation of a homogeneous lubricating film of regular thickness which is stabilized by means of hydrodynamic pressure zones. The continuous, capillary lubricating film and the self-centering mechanism of the hydrodynamic radial bearing ensure that the rotation between shaft and tube is stable and concentric.

The bearing is stabilized along the rotational axis by means of an appropriately designed hydrodynamic axial bearing or thrust bearing. The thrust bearing is preferably formed by the two end faces of a thrust plate disposed at one end of the shaft, the thrust plate being accommodated in a recess formed by the bearing sleeve and a cover plate. One end face of the thrust plate is associated with a corresponding end face of the bearing sleeve and the other end face is associated with an inner end face of the cover plate. The cover plate thus forms a counter bearing to the thrust plate and seals the entire bearing system from below, preventing air from penetrating into the bearing gap filled with lubricant or from lubricant escaping from the bearing gap. In the case of a hydrodynamic axial bearing as well, the bearing surfaces interacting with each other are provided with a groove pattern to ensure the lubricant circulates within the region of the axial bearing in the required manner.

At the opposite, open end of the bearing, a free area can be formed between the shaft and the inner surface of the bearing, the free area acting as both a lubricant reservoir and as an expansion volume for the lubricant. This area also takes on the function of sealing the bearing. Under the influence of capillary forces, the oil located in the free area between the shaft and the tapered outlet of the bearing sleeve forms a stable, continuous liquid film which is why this kind of seal is also referred to as a capillary seal.

Owing to the groove pattern mentioned above, the corresponding rotation of the shaft produces a dynamic flow of lubricant within the bearing gap in the direction of the closed end of the bearing, the hydrodynamic pressure in the axial region being higher than in the radial region, particularly in the radial bearing region located at the free end of the shaft. This difference in pressure building up in an axial direction in the bearing means that the thrust plate does not rotate in the middle of the axial bearing gap of the recess surrounding the thrust plate as expected, but rather that the axial bearing gap between the end face of the thrust plate and the bearing sleeve is significantly smaller than the bearing gap between the end face of the thrust plate and the cover plate. In particular, there is also greater pressure at the outer circumference of the thrust plate than in the region close to the shaft which can go to intensify the effect described above. Depending on the design and the load on the bearing, this imbalance of hydrodynamic pressure can result in the end face of the thrust plate coming dangerously close to the bearing sleeve and perhaps even touching it. This could go to shorten the useful life of the bearing or even result in damage to the bearing.

A hydrodynamic bearing having means of equalizing the pressure between the bearing regions has been revealed in U.S. Pat. No. 5,855,438. Here, air is preferably used as a bearing fluid, the pressure equalization between the radial bearing regions being effected using a ventilation hole that connects the central region of the bearing gap to the surrounding atmosphere. This kind of pressure equalization, however, is not suitable for a hydrodynamic bearing using a liquid lubricant since there is a risk of the lubricant escaping through the ventilation hole. Filling the lubricant into this kind of bearing would in any case be extremely difficult due to the extra ventilation hole. A further disadvantage is that there is no direct pressure equalization in the region of the axial bearing.

SUMMARY OF THE INVENTION

It is thus the object of the invention to provide a hydrodynamic bearing in which provision has been made for pressure to be equalized between a radial bearing region and an axial bearing region.

This object has been achieved by a hydrodynamic bearing having the characteristics outlined in claim 1. The invention also provides a spindle motor in accordance with claim 17 as well as a hard disk drive in accordance with claim 18.

Beneficial embodiments of the invention are outlined in the subordinate patent claims.

The invention provides a hydrodynamic bearing, particularly for a spindle motor, comprising a shaft, a thrust plate connected to the shaft and a bearing sleeve closed at one end by a cover plate, the bearing sleeve enclosing the shaft and the thrust plate with a slight radial spacing forming a concentric bearing gap filled with a lubricant. As is already known, the surfaces of the bearing sleeve and the shaft facing each other form at least one radial bearing region and the surfaces of the bearing sleeve, the cover plate and the thrust plate facing each other form at least one axial bearing region. In the hydrodynamic bearing according to the invention, at least one connecting channel is provided which connects a section between the bearing sleeve and the shaft abutting the radial bearing region and a section of the bearing gap abutting the axial bearing region to each other. Here, either a direct or an indirect connection between the bearing regions can be provided via the connecting channel.

The invention has the advantage that the bearing fluid located in the bearing gap can not only circulate via the bearing gap but also via the connecting channel between the radial bearing regions and the axial bearing regions, the connecting channel preferably connecting the regions of the bearing that are furtherest apart from each other. This enables pressure to be equalized within the bearing gap as a result of which the difference in pressure between the bearing regions can be equalized.

Within the bearing gap there is now a relatively equalized flow of pressure in the bearing fluid, so that during rotation almost the same bearing gap width is produced at both end faces of the thrust plate. This means that, seen from an axial direction, the thrust plate rotates in about the middle of the recess formed by the bearing sleeve and the cover plate. This reduces the risk of the bearing being damaged due to components of the axial bearing touching each other and the bearing can also be subjected to the same load in both axial directions.

It is preferable if the connecting channel extends from one end face of the bearing sleeve to the other end face so that the regions of the bearing gap that are spaced furtherest apart from each other are connected to each other.

Furthermore, the connecting channel can consist of an axial section, preferably running parallel to a rotational axis of the shaft, and a radial section running transversal, preferably perpendicular, to the rotational axis. In principle, both the axial as well as the radial section can be at any angle between 0° and 90° to the rotational axis.

The entire connecting channel, including both its axial as well as its radial section, can run within the bearing sleeve. This has the advantage that only the bearing sleeve requires additional processing to create the connecting channel.

Other embodiments and arrangements of the connecting channel have, however, been provided, particularly for spindle motors in which the bearing sleeve is sealed at its top end by a bearing cover, wherein this kind of bearing cover can consist of several parts and can include an annular disk and a covering cap.

In such an embodiment of the bearing, the axial section of the connecting channel is preferably provided in the bearing sleeve and the radial section of the connecting channel is preferably provided in the bearing cover. Provision can, however, also be made for the radial section of the connecting channel to be formed partly in the bearing sleeve and partly in the bearing cover or entirely in the bearing sleeve.

The axial section of the connecting channel preferably takes the form of an axial bore within the bearing sleeve whereas the radial section of the connecting channel can take the form of a bore, or preferably an annular groove, in the bearing sleeve and/or parts of the bearing cover. An annular groove has the advantage that the bearing fluid is distributed evenly over the circumference of the bearing gap and can be supplied to the bearing gap.

It is known, and also possible in preferred embodiments of the hydrodynamic bearing according to the invention, to provide an equalizing volume for the bearing fluid in the region of the top end of the bearing sleeve which can also act as a capillary seal. This equalizing volume preferably takes the form of a conical cavity connected to the bearing gap.

The equalizing volume can extend between the bearing sleeve and the shaft substantially parallel to a rotational axis of the bearing, it can extend between the bearing sleeve and the bearing cover substantially perpendicular to a rotational axis of the bearing or it can extend between the annular disk and the covering cap fully within the bearing cover substantially perpendicular to a rotational axis of the bearing. In principle, the equalizing volume can be at any other possible angle between 0° and 90° to the rotational axis.

In accordance with the invention, one end of the connecting channel can now be directly connected to the equalizing volume, which in turn is connected directly or indirectly to the bearing gap. Ambient pressure now prevails at the axial bearing end of the connecting channel just as it does in the equalizing volume.

The hydrodynamic bearing according to the invention can be used in electric motors and particularly in spindle motors for hard disk drives.

BRIEF DESCRIPTION OF THE DRAWINGS

The invention is described in more detail below on the basis of preferred embodiments with reference to the drawings. The figures show:

FIG. 4b shows an enlarged view from above of the cover plate according to FIGS. 4 and 4a.

DESCRIPTION OF PREFERRED
EMBODIMENTS OF THE INVENTION

The drawings show spindle motors to drive a hard disk drive having a hydrodynamic bearing system according to the invention. In the illustrated embodiments, a shaft carrying the rotor is rotatably supported in a stationary bearing sleeve. It is understood that the invention also includes designs in which a stationary shaft is enclosed by a rotatable bearing sleeve carrying the rotor.

Figure 1:
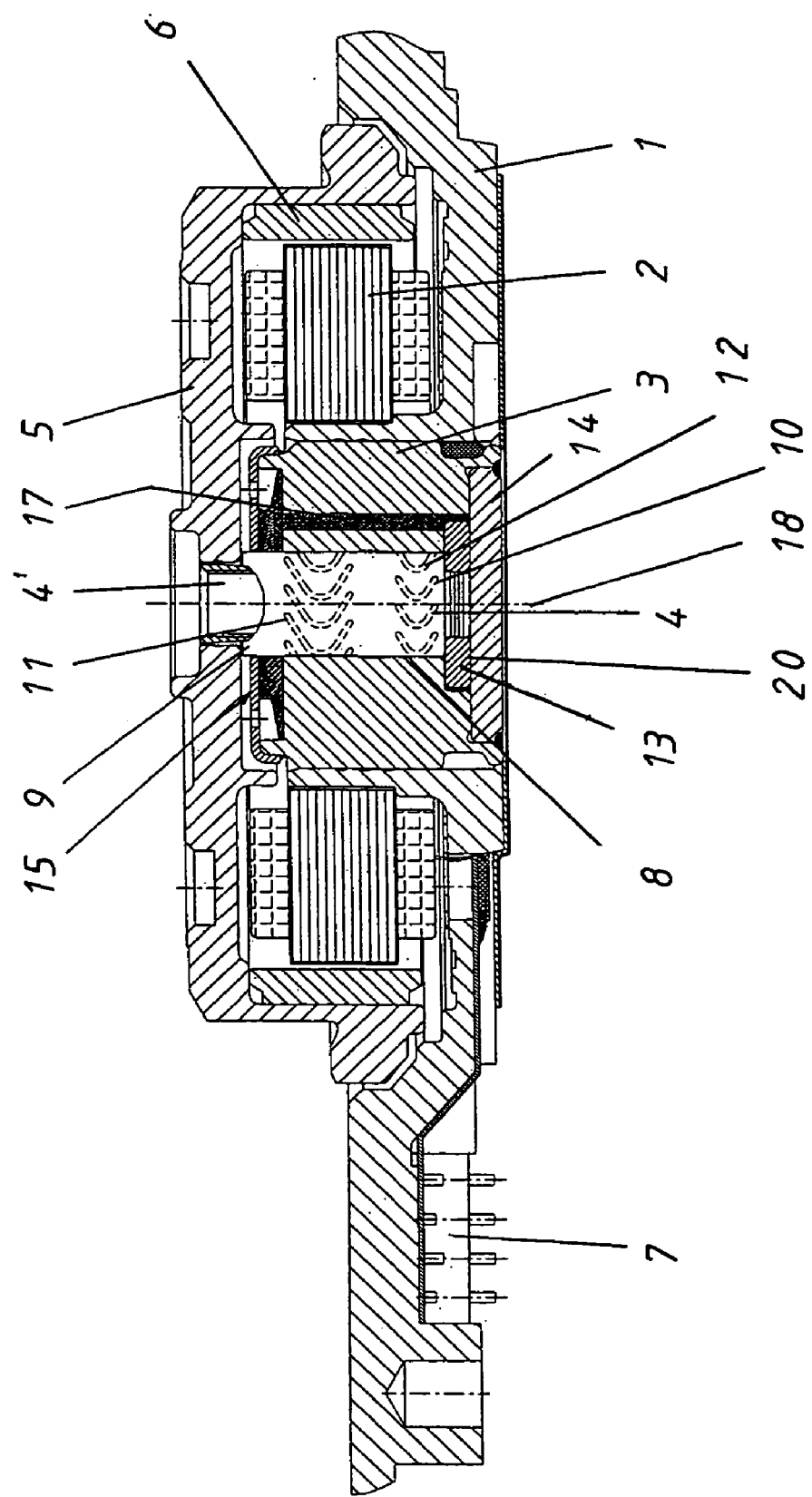
FIG. 1 shows a schematic longitudinal view of a spindle motor having a hydrodynamic bearing in accordance with a first embodiment of the invention.

The spindle motor according to FIG. 1 comprises a stationary baseplate 1 on which a stator arrangement 2, consisting of a stator core and windings, is arranged. A bearing sleeve 3 is firmly accommodated in a recess in the baseplate 1 and has an axial cylindrical bore in which a shaft 4 is rotatably accommodated. The free end of the shaft 4 carries a rotor hub 5 on which one or more platters (not illustrated) of the hard disk drive are arranged and secured. An annular permanent magnet 6 having a plurality of pole pairs is arranged at the lower inside edge of the rotor hub 5, an alternating electrical field being applied to the pole pairs by the stator arrangement 2 separated from the pole pairs by an air gap, so that the rotor 5 is put into rotation together with the shaft 4. Power is supplied to the stator windings, for example, via electrical contacts 7.

Between the inside diameter of the bearing sleeve 3 and the slightly smaller outside diameter of the shaft 4 there remains a bearing gap 8 which is filled with a lubricant, preferably a liquid bearing fluid. The hydrodynamic bearing arrangement is formed by two radial bearing regions 9, 10 which are indicated by a groove pattern 11, 12 that is provided on the surface of the shaft 3 and/or on the inner surface of the bearing sleeve 3. As soon as the rotor 5, and thus the shaft 4 as well, are put into rotation, hydrodynamic pressure is built up in the bearing gap 8 or in the lubricant found in the bearing gap due to the groove pattern 11, 12, so that the bearing can then support a load.

A hydrodynamic thrust bearing formed at the lower end of the shaft 4 by a thrust plate 13 connected to the shaft 4 and a cover plate 14 takes up the axial load of the bearing arrangement. This axial bearing region 20 is hermetically sealed by the cover plate 14 so that no lubricant can escape from the bearing gap 8. To ensure that sufficient hydrodynamic pressure is built up in the axial bearing, the surfaces of the thrust plate 13 and/or the cover plate 14 facing each other are provided with a groove pattern.

The shaft 4 protrudes from the bearing sleeve 3 at its end 4'. The bearing sleeve 3 is sealed at this end by a bearing cover 15.

Figure 1A:
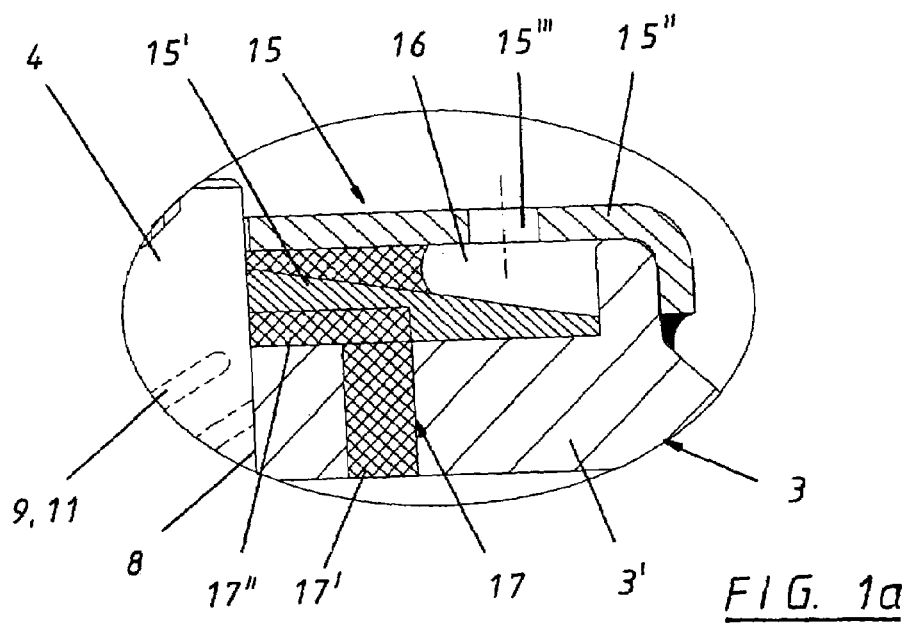
FIG. 1a shows an enlarged longitudinal section through the bearing according to FIG. 1 in the region of the bearing cover.

As can be seen in FIG. 1, and in particular in FIG. 1a, the bearing cover 15 is formed in two parts and includes an annular disk 15' inserted into a depression at the end face 3' of the bearing sleeve 3 whose thickness decreases radially towards the outside. Moreover, the bearing cover 15 includes a covering cap 15" which is set on an annular axial extension arranged outside the annular disk 15' in a radial direction. The axial extension additionally ensures that there is a defined spacing between the annular disk 15' and the covering cap 15".

Due to the approximately conical cross-section of the annular disk 15', an annular cavity, also having a conical cross-section, is formed between the annular disk 15' and the covering cap 15", this cavity widening radially towards the outside and acting as an equalizing volume 16 for the bearing fluid. The region of the equalizing volume 16 located radially towards the inside abuts the bearing gap 8. The covering cap 15" further has a filling hole 15'" leading to the equalizing volume 16 for the purpose of filling in the bearing fluid.

As a means of equalizing the pressure between the axial bearing region 20 and the radial bearing regions, in particular the "upper" radial bearing region 9, according to the invention at least one connecting channel 17 is provided through which the bearing fluid can flow freely. The connecting channel 17 mainly takes the form of a bore within the bearing sleeve 3.

Figure 1B:
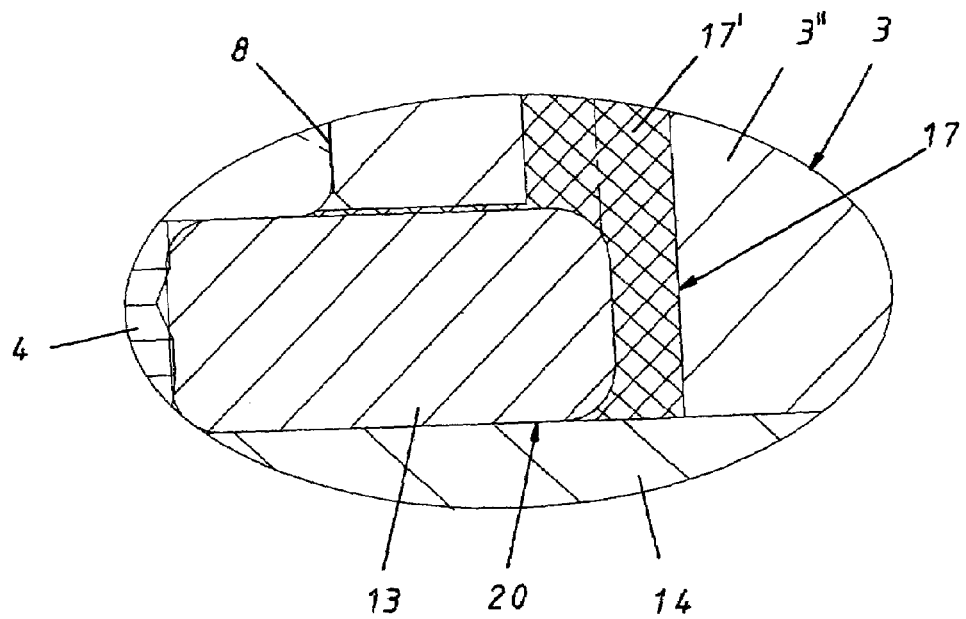
FIG. 1b shows an enlarged longitudinal section through the bearing according to FIG. 1 in the region of the axial bearing region.

It can be seen from FIG. 1b in particular that the connecting channel 17 begins at the lower end face 3" of the bearing sleeve at the outside diameter of the thrust plate 13 and extends in the form of an axial section 17' as far as the other end face 3' of the bearing sleeve.

As can be seen in FIG. 1a, the axial section 17' of the connecting channel 17 turns into a radial section 17" which takes the form of a recess or groove within the annular disk 15', the annular disk 15' engaging directly against the end face 3' of the bearing sleeve 3. The radial section 17" of the connecting channel ends in the bearing gap 8 close to the upper radial bearing region 9. In this embodiment of the invention, the connecting channel 17 is realized partly within the bearing sleeve 3 and partly within the annular disk 15' and ensures that the pressure is equalized in the bearing gap between the axial bearing region 20 and the upper radial bearing region 9.

Figure 2:
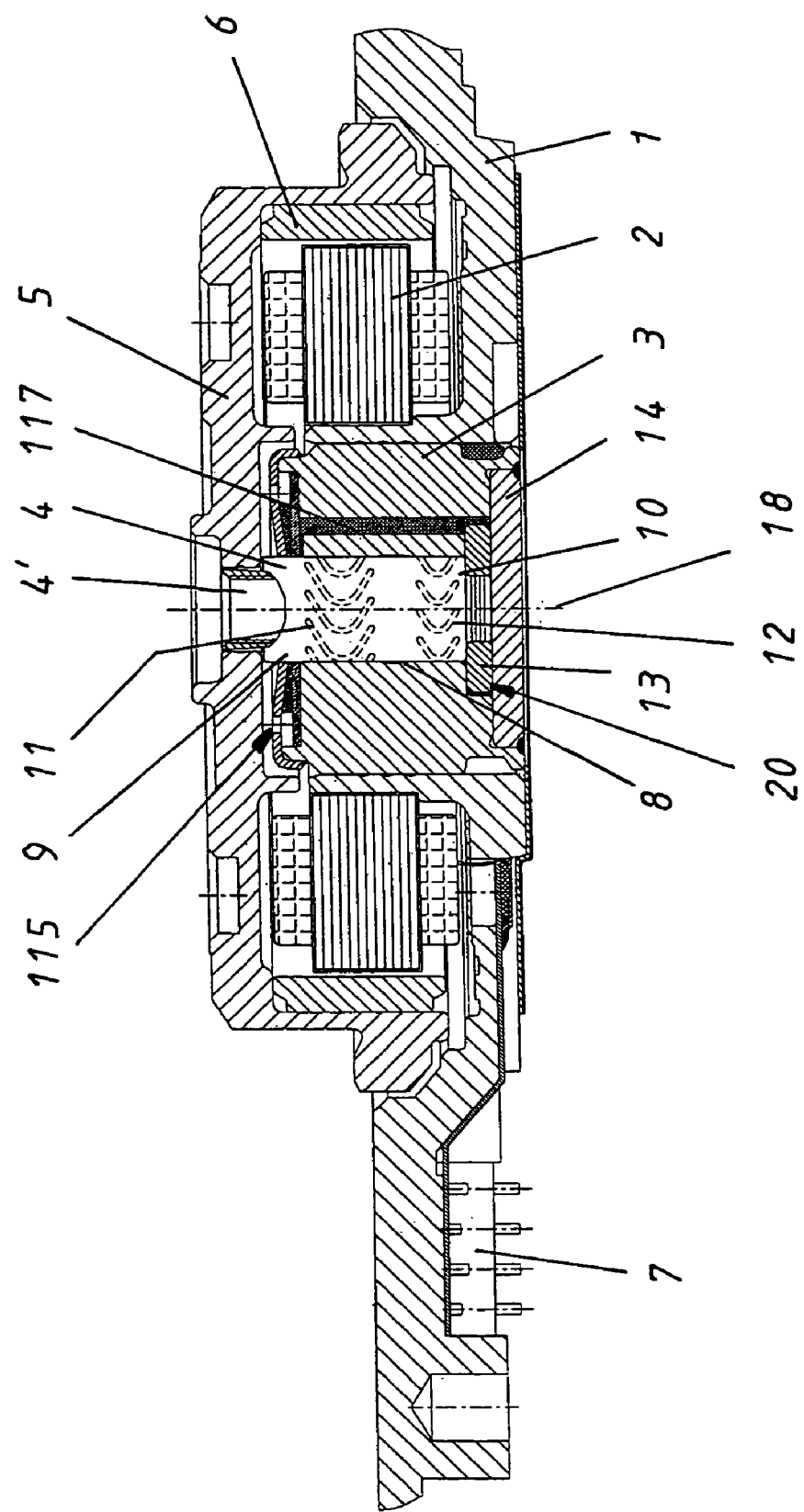
FIG. 2 shows a schematic longitudinal view of a spindle motor having a hydrodynamic bearing in accordance with a second embodiment of the invention.

FIG. 2 depicts a spindle motor whose construction essentially corresponds to the construction of the spindle motor shown in FIG. 1. Reference is made to the above comments, particularly those concerning the components and features indicated by the reference numbers 1-14.

Figure 2A:
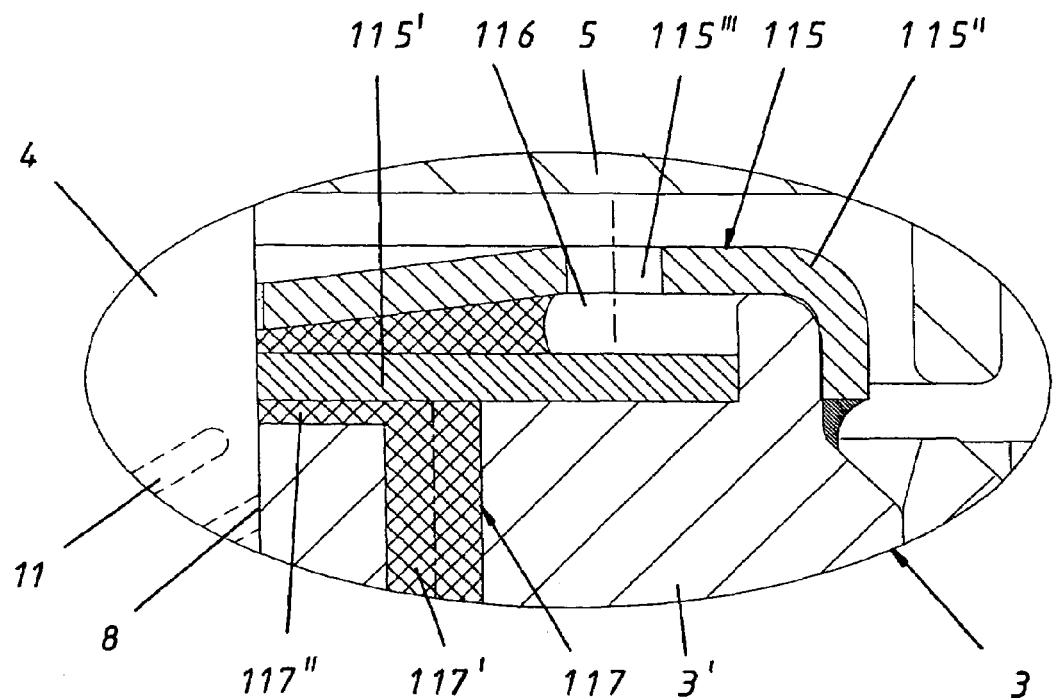
FIG. 2a shows an enlarged longitudinal section through the bearing according to FIG. 2 in the region of the bearing cover.

It can be seen from FIGS. 2 and 2a that a two-part bearing cover 115 is also used, comprising an annular disk 115' inserted into a depression in the end face 3' of the bearing sleeve 3 and a covering cap 115". The thickness of the annular disk 115' remains constant. The covering cap 115" is set on an annular axial extension arranged outside the annular disk 115' in a radial direction. The base of the covering cap 115" is conically retracted in the direction of the shaft in such a way that between the covering cap 115" and the annular disk 115' an annular cavity with a conical cross-section is created, the cavity widening radially towards the outside and acting as an equalizing volume 116 for the bearing fluid. The region of the equalizing volume 116 located radially towards the inside abuts the bearing gap 8. The covering cap 115" has a filling hole 115'" leading to the equalizing volume 116 for the purpose of filling in the bearing fluid.

In this embodiment of the invention at least one connecting channel 117 is also provided that directly connects the axial bearing region 20 and the radial bearing region, particularly the "upper" radial bearing region 9, to each other and ensures that the pressure is equalized in the bearing gap 8. The connecting channel 117 mainly takes the form of a bore within the bearing sleeve 3.

Figure 2B:
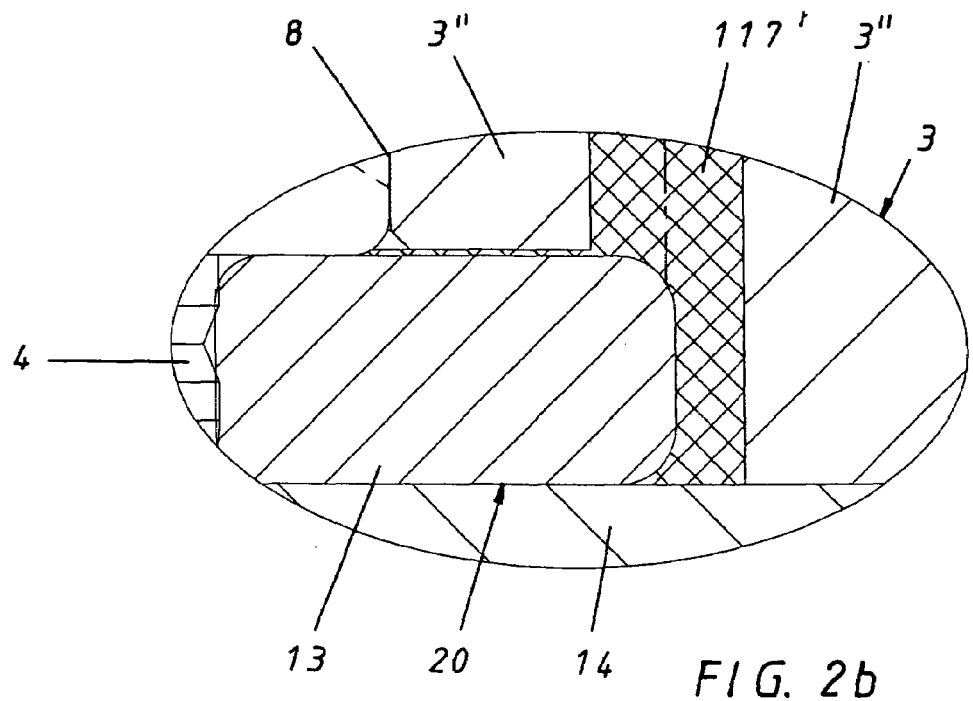
FIG. 2b shows an enlarged longitudinal section through the bearing according to FIG. 2 in the region of the axial bearing region.

It can be particularly seen from FIG. 2b that the connecting channel 117 begins at the lower end face 3" of the bearing sleeve at the outside diameter of the thrust plate 13 and extends in the form of an axial section 117' as far as the other end face 3' of the bearing sleeve. Here, the axial section 117' of the connecting channel 117 turns into a radial section 117", as can be seen in FIG. 2a. The radial section 117" takes the form of a recess or groove in the end face 3' of the bearing sleeve 3. The annular disk 115' engages directly against the end face 3' of the bearing sleeve 3 resulting in a closed, radial channel section 117" that ends in the bearing gap 8 close to the upper radial bearing region 9. In this embodiment of the invention, the connecting channel 117 is realized fully within the bearing sleeve 3.

Figure 3:
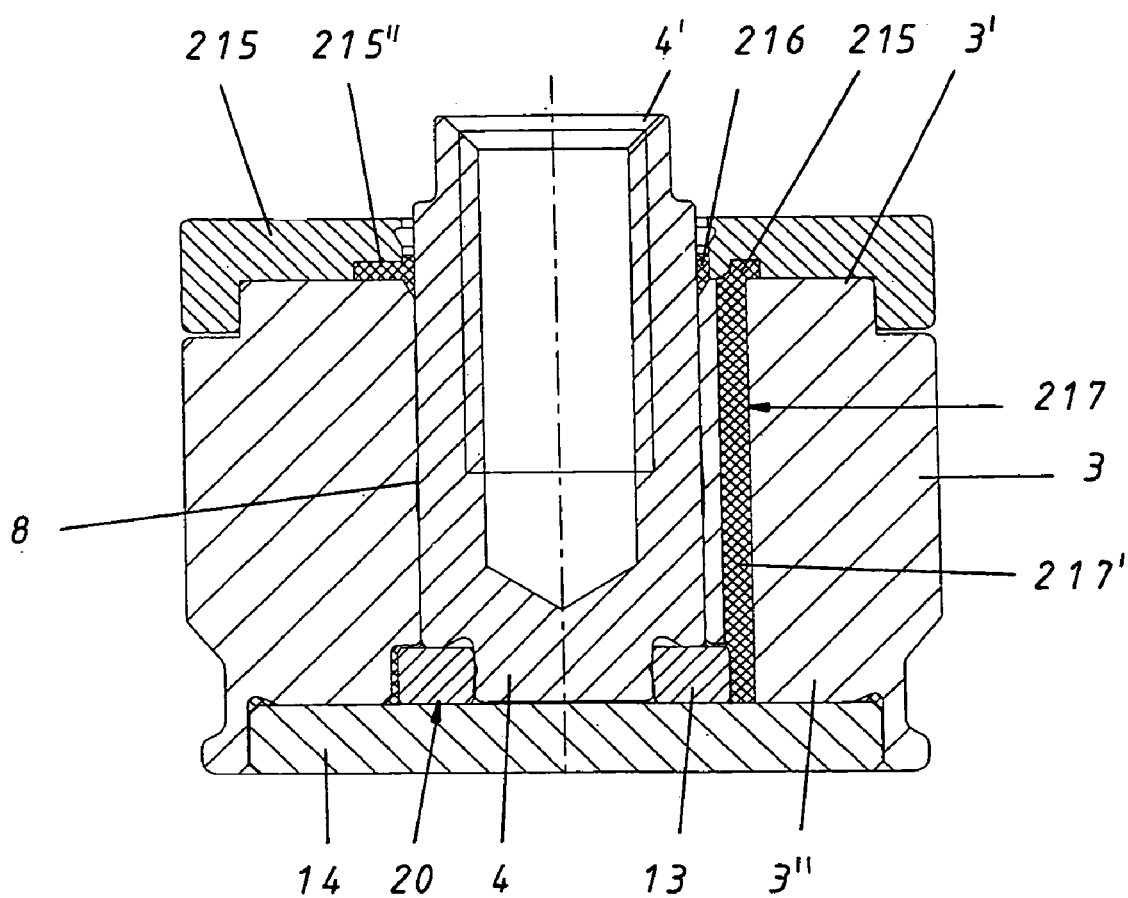
FIG. 3 shows a schematic longitudinal view of a spindle motor having a hydrodynamic bearing in accordance with a third embodiment of the invention.
Figure 3A:
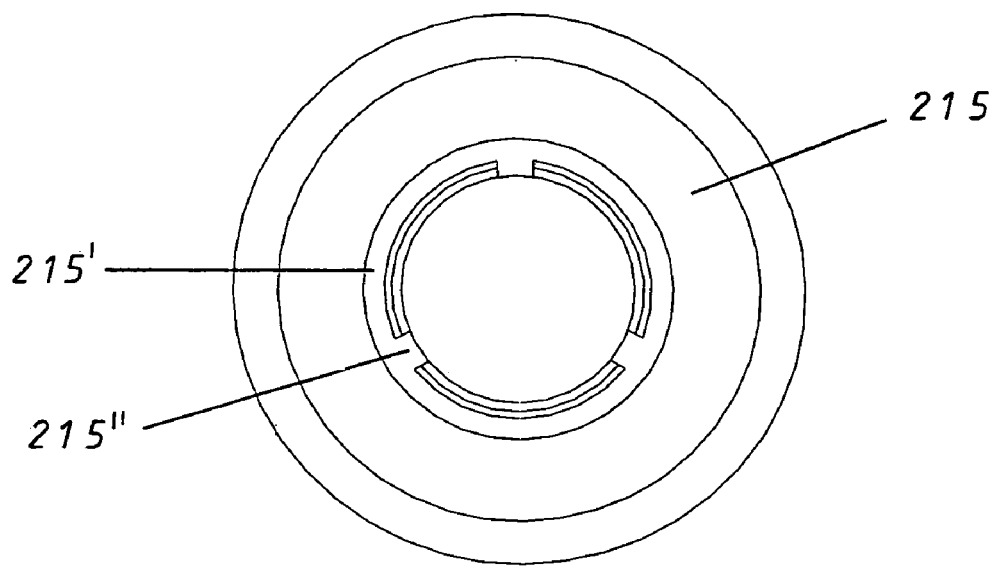
FIG. 3a shows an inner view of the bearing cover according to FIG. 3.

FIGS. 3 and 3a show another possible embodiment of a bearing having a direct connecting channel between the axial bearing region and a radial bearing region.

By tapering the inside diameter of the bearing sleeve 3 at the end face, an annular, conical equalizing volume 216 is created between the end face 3' of the bearing sleeve 3 and the outside diameter of the shaft 4, the equalizing volume 216 being directly connected to the axial bearing gap 8. A one-piece, approximately can-shaped bearing cover 215 is placed directly on the end face 3' of the bearing sleeve. At its end face facing the bearing sleeve 3, the bearing cover 215 has an annular channel 215' that is connected to the equalizing volume 216 via a plurality of fluid conducting channel sections 215" running radially towards the inside.

A connecting channel 217 is provided within the bearing sleeve 3 which connects the axial bearing region 20 and the "upper" radial bearing region 9 directly to each other and allows the pressure to be equalized in the bearing gap 8 or between the bearing gap 8 and the equalizing volume 216. The axial section 217' of the connecting channel takes the form of a bore within the bearing sleeve 3 and begins at the lower end face 3" of the bearing sleeve at the outside diameter of the thrust plate 13 and ends at the other end face 3' of the bearing sleeve directly in the annular channel 215' in the bearing cover 215, the annular channel being connected to the bearing gap 8 via the equalizing volume 216.

Figure 4:
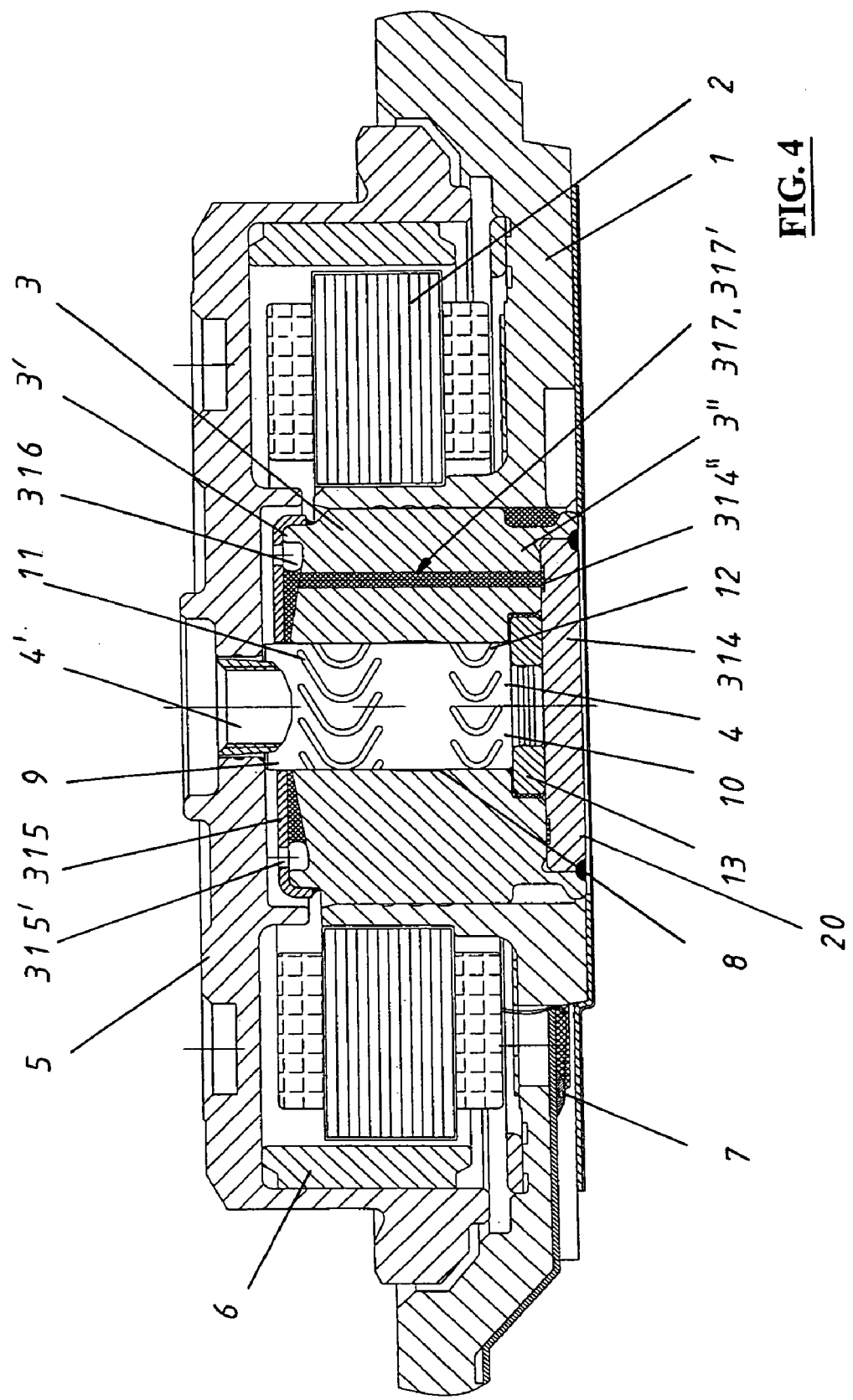
FIG. 4 shows a schematic longitudinal view of a spindle motor having a hydrodynamic bearing in accordance with a fourth embodiment of the invention.
Figure 4A:
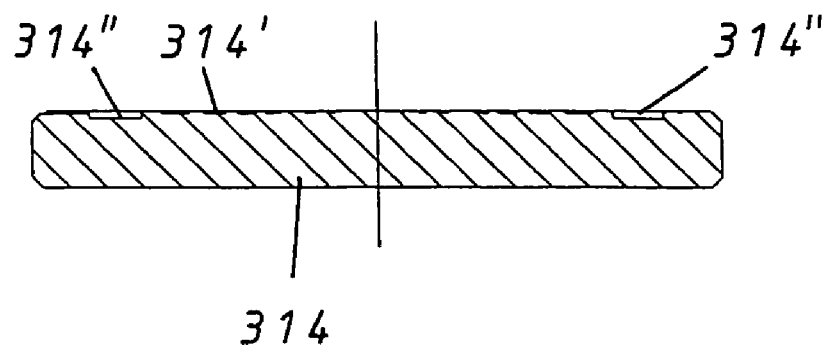
FIG. 4a shows an enlarged longitudinal section through the cover plate according to FIG. 4.
Figure 4B:
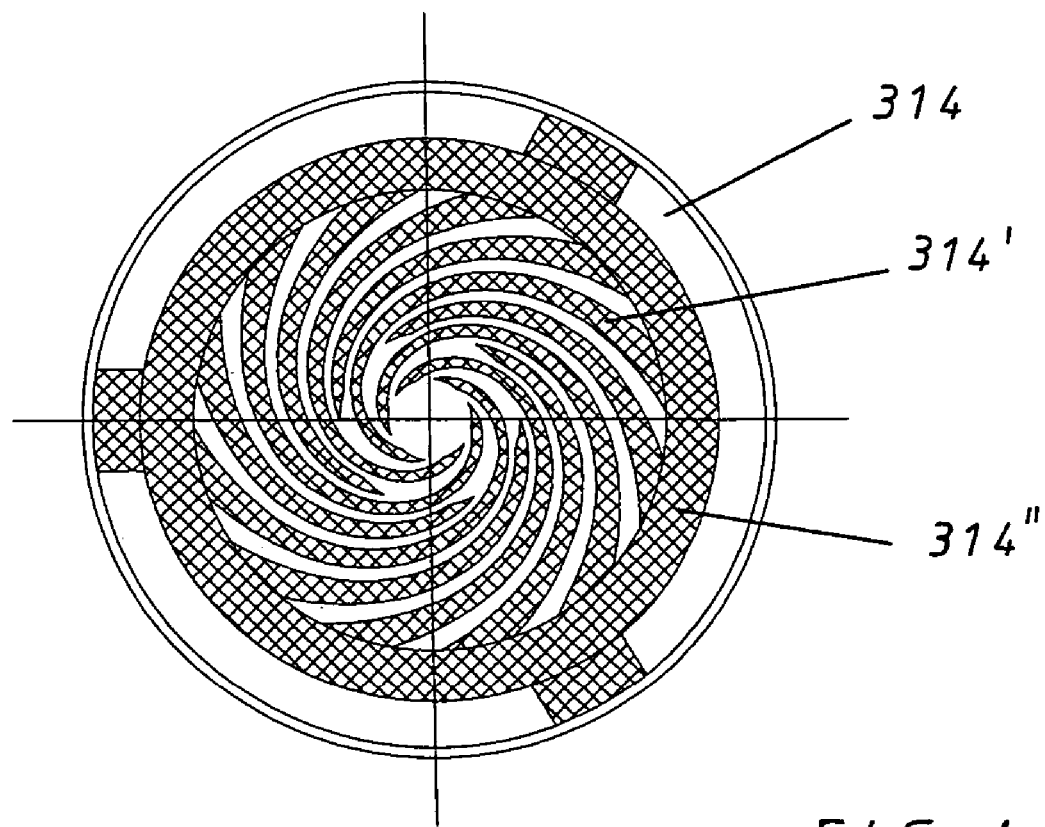

Finally, a fourth embodiment of a spindle motor having the bearing according to the invention is shown in FIGS. 4, 4a and 4b. The basic construction of the spindle motor essentially corresponds to the construction of the spindle motor shown in FIG. 1. Reference is made to the above comments, particularly those concerning the components and features indicated by the reference numbers 1-14.

It can be seen from FIG. 4 that the upper end face 3' of the bearing sleeve 3 is covered by an approximately can-shaped bearing cover 315 which is set on an annular axial extension of the bearing sleeve 3.

The end face 3' of the bearing sleeve is provided with a chamfer or a counter bore which extends radially outwards from the inside diameter of the bearing sleeve 3 as far as the annular extension. This goes to form a free area having a conical cross-section widening towards the outside between the end face 3' of the bearing sleeve 3 and the inner surface of the bearing cover 315, this free area acting as an equalizing volume 316 for the bearing fluid. The region of the equalizing volume 316 located radially towards the inside abuts the bearing gap 8. The covering cap 315 has a filling hole 315' leading to the equalizing volume 316 for the purpose of filling in the bearing fluid.

FIGS. 4a and 4b show that the cover plate 314, forming the axial bearing together with the thrust plate 13, has a spiral groove pattern 314' as is known in the prior art. The groove pattern 314' displaces the bearing fluid from the center of the cover plate 314 towards the outer regions. The individual spiral arms of the groove pattern 314' end in an annular channel 314" in which the bearing fluid displaced towards the outside gathers.

The bearing fluid found in the annular channel 314" can flow off according to the invention via a connecting channel 317 extending from one end face 3" to the other end face 3' of the bearing sleeve 3 and preferably takes the form of an axial bore 317' fully within the bearing sleeve 3. The connecting channel 317 begins at the lower end face 3" of the bearing sleeve in the region of the annular channel 314" and ends directly in the equalizing volume 316.

The connecting channel 317 creates a connection between the axial bearing region 20 and the upper radial bearing region 9 via the equalizing volume 316, and allows the pressure to be equalized in the bearing gap 8.

The characteristics revealed in the above description, the claims and the drawings can be important for the realization of the invention in its various embodiments both individually and in any combination whatsoever.

IDENTIFICATION REFERENCE LIST

1 Baseplate
2 Stator arrangement
3 Bearing sleeve
3', 3" End face of the bearing sleeve
4 Shaft
4' End of the shaft
5 Rotor hub
6 Permanent magnet
7 Electrical contact unit
8 Bearing gap
9 Radial bearing region
10 Radial bearing region
11 Groove pattern
12 Groove pattern
13 Thrust plate
14 Cover plate
15 Bearing cover
15' Annular disk
15" Covering cap
15''' Filling hole
16 Equalizing volume
17 Connecting channel
17' Axial section
17" Radial section
18 Rotational axis
20 Axial bearing region
115 Bearing cover
115' Annular disk
115" Covering cap
115''' Filling hole
116 Equalizing volume
117 Connecting channel
117' Axial section
117" Radial section
215 Bearing cover
215' Annular channel
215" Channel section
216 Equalizing volume
217 Connecting channel
217' Axial section
314 Cover plate
314' Groove pattern
314" Annular channel
315 Bearing cover
315' Filling hole
316 Equalizing volume
317 Connecting channel
317' Axial section

The invention claimed is:

1. Hydrodynamic bearing having a shaft (4), a thrust plate (13) connected to the shaft and a bearing sleeve (3) closed at one end by a cover plate (14; 314) and sealed at the other end by a capillary seal, the bearing sleeve (3) enclosing the shaft and the thrust plate with a slight radial spacing forming a concentric bearing gap (8) filled with a lubricant, the surfaces of the bearing sleeve (3) and the shaft (4) facing each other forming at least one radial bearing region (9; 10) and the surfaces of the bearing sleeve (3), the cover plate (14; 314) and the thrust plate (13) facing each other forming at least one axial bearing region (2), characterized by at least one connecting channel (17; 117; 217; 317) that connects a section between the bearing sleeve (3) and the shaft (4) abutting the radial bearing region (9) and a section of the bearing gap (8) abutting the axial bearing region (20) to each other without directly connecting to the capillary seal.

2. Hydrodynamic bearing according to claim 1, characterized in that the connecting channel (17; 117; 217; 317) extends from one end face (3') of the bearing sleeve (3) to the other end face (3").

3. Hydrodynamic bearing according to claim 1, characterized in that the connected channel (17; 117) has an axial section running in the direction of a rotational axis of the shaft and a radial section running in a direction transversal to the rotational axis.

4. Hydrodynamic bearing according to claim 1, characterized in that the bearing sleeve (3) is sealed at its end face by a bearing cover (15; 115; 215; 315).

5. Hydrodynamic bearing according to claim 1, characterized in that the connecting channel (17; 117; 217; 317) runs at least partly within the bearing sleeve (3).

6. Hydrodynamic bearing according to claim 1, characterized in that the radial section (17"; 117") of the connecting channel takes the form of an annular groove in the bearing sleeve (3) and/or parts of the bearing cover (15; 115; 215; 315).

7. Hydrodynamic bearing according to claim 1, characterized in that an equalizing volume (16; 116; 216; 316) for the bearing fluid is provided in the region of at least one end face (3') of the bearing sleeve.

8. Hydrodynamic bearing according to claim 1, characterized in that the equalizing volume (16; 116; 216; 316) takes the form of a cavity, approximately conical in cross-section, connected to the bearing gap (8).

9. Hydrodynamic bearing according to claim 1, characterized in that the equalizing volume (216) extends between the bearing sleeve (3) and the shaft (4) substantially parallel to a rotational axis (18) of the bearing.

10. Hydrodynamic bearing according to claim 1, characterized in that the equalizing volume (316) extends between the bearing sleeve (3) and the bearing cover (315) in a substantially perpendicular plane to the rotational axis (18) of the bearing.

11. Hydrodynamic bearing according to claim 1, characterized in that one end of the connecting channel (217; 317) is directly connected to the equalizing volume (216; 316).

12. Hydrodynamic bearing according to claim 1, characterized in that a cover plate (314) includes an annular channel (314") connected to the connecting channel (317).

13. Spindle motor having a hydrodynamic bearing according to claim 1.

14. Hard disk drive having a spindle motor according to claim 13.

15. Hydrodynamic bearing having a shaft (4), a thrust plate (13) connected to the shaft and a bearing sleeve (3) closed at one end by a cover plate (14; 314) characterized in that the bearing sleeve is sealed at the other end by a bearing cover (15; 115; 215; 315), that the bearing cover (15; 115) consists of several parts and includes an annular disk (15'; 115') and a covering cap (15"; 115") which bearing cover forms a capillary seal, the bearing sleeve (3) enclosing the shaft and the thrust plate with a slight radial spacing forming a concentric bearing gap (8) filled with a lubricant, the surfaces of the bearing sleeve (3) and the shaft (4) facing each other forming at least one radial bearing region (9; 10) and the surfaces of the bearing sleeve (3), the cover plate (14; 314) and the thrust plate (13) facing each other forming at least one axial bearing region (2), characterized by at least one connecting channel (17; 117; 217; 317) that connects a section between the bearing sleeve (3) and the shaft (4) abutting the radial bearing region (9) and a section of the bearing gap (8) abutting the axial bearing region (20) to each other without directly connecting to the capillary seal.

16. Hydrodynamic bearing having a shaft (4), a thrust plate (13) connected to the shaft and a bearing sleeve (3) closed at one end by a cover plate (14; 314) and sealed at the other end by a capillary seal, the bearing sleeve (3) enclosing the shaft and the thrust plate with a slight radial spacing forming a concentric bearing gap (8) filled with a lubricant, the surfaces of the bearing sleeve (3) and the shaft (4) facing each other forming at least one radial bearing region (9; 10) and the surfaces of the bearing sleeve (3), the cover plate (14; 314) and the thrust plate (13) facing each other forming at least one axial bearing region (2), characterized by at least one connecting channel (17; 117; 217; 317) having an axial section running in the direction of a rotational axis of the shaft and a radial section running in a direction transversal to the rotational axis that connects a section between the bearing sleeve (3) and the shaft (4) abutting the radial bearing region (9) and a section of the bearing gap (8) abutting the axial bearing region (20) to each other without directly connecting to the capillary seal, and further characterized in that the axial section (17'; 117') of the connecting channel runs at least partly in the bearing sleeve and the radial section (17"; 117") of the connecting channel runs at least partly in the bearing cover.

17. Hydrodynamic bearing having a shaft (4), a thrust plate (13) connected to the shaft and a bearing sleeve (3) closed at one end by a cover plate (14; 314) and sealed at the other end by a capillary seal, the bearing sleeve (3) enclosing the shaft and the thrust plate with a slight radial spacing forming a concentric bearing gap (8) filled with a lubricant, the surfaces of the bearing sleeve (3) and the shaft (4) facing each other forming at least one radial bearing region (9; 10) and the surfaces of the bearing sleeve (3), the cover plate (14; 314) and the thrust plate (13) facing each other forming at least one axial bearing region (2), characterized by at least one connecting channel (17; 117; 217; 317) having an axial section running in the direction of a rotational axis of the shaft and a radial section running in a direction transversal to the rotational axis that connects a section between the bearing sleeve (3) and the shaft (4) abutting the radial bearing region (9) and a section of the bearing gap (8) abutting the axial bearing region (20) to each other without directly connecting to the capillary seal, and further characterized in that the axial section (17'; 117') of the connecting channel is formed at least partly in the bearing sleeve and the radial section (17"; 117") of the connecting channel is formed at least partly in the bearing sleeve and partly in the bearing cover.

18. Hydrodynamic bearing having a shaft (4), a thrust plate (13) connected to the shaft and a bearing sleeve (3) closed at one end by a cover plate (14; 314) and sealed at the other end by a bearing cover (15; 115; 215; 315) characterized in that the bearing cover (15; 115) consists of several parts and includes an annular disk (15"; 115') and a covering cap (15"; 115") which bearing cover forms a capillary seal, the bearing sleeve (3) enclosing the shaft and the thrust plate with a slight radial spacing forming a concentric bearing gap (8) filled with a lubricant, the surfaces of the bearing sleeve (3) and the shaft (4) facing each other forming at least one radial bearing region (9; 10) and the surfaces of the bearing sleeve (3), the cover plate (14; 314) and the thrust plate (13) facing each other forming at least one axial bearing region (2), characterized by at least one connecting channel (17; 117; 217; 317) that connects a section between the bearing sleeve (3) and the shaft (4) abutting the radial bearing region (9) and a section of the bearing gap (8) abutting the axial bearing region (20) to each other without directly connecting to the capillary seal, and further characterized in that an equalizing volume (16; 116) for the bearing fluid is provided which extends between the annular disk (15'; 115') and the covering cap (15"; 115") fully within the bearing cover (15; 115) substantially perpendicular to the rotational axis (18) of the bearing.

* * * * *